(12) United States Patent
Wu (10) Patent No.: US 9,172,870 B2
(45) Date of Patent: Oct. 27, 2015

(54) REAL-TIME IMAGE PROCESSING METHOD AND DEVICE ENHANCING THE RESOLUTION OF SUCCESSIVE IMAGES

(71) Applicant: VIVOTEK INC., New Taipei (TW)

(72) Inventor: Jen-Chih Wu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/255,603

(22) Filed: Apr. 17, 2014

(65) Prior Publication Data

US 2014/0368682 A1    Dec. 18, 2014

(30) Foreign Application Priority Data

Jun. 14, 2013    (TW) .............. 102121252 A (51) Int. Cl.
*H04N 5/232* (2006.01)

(52) U.S. Cl.
CPC ................ *H04N 5/23232* (2013.01)

(58) Field of Classification Search
CPC H04N 5/23232; G06T 3/4007; G06T 3/4038; G06T 3/403; G06T 11/60
See application file for complete search history.

(56) References Cited

U.S. PATENT DOCUMENTS

| 7,239,428 B2 * | 7/2007 | Solecki .................... 358/3.01 |
| 7,352,919 B2 * | 4/2008 | Zhou et al. .................... 382/299 |
| 2007/0098301 A1 * | 5/2007 | Rengakuji et al. ............ 382/300 |
| 2009/0238535 A1 * | 9/2009 | Robertson et al. .............. 386/37 |
| 2014/0072242 A1 * | 3/2014 | Wei et al. ...................... 382/299 |

* cited by examiner

*Primary Examiner* — Luong T Nguyen (74) *Attorney, Agent, or Firm* — Locke Lord LLP; Tim Tingkang Xia, Esq.

(57) ABSTRACT

Disclosed herein are a method and a device of real-time image processing. The method comprises capturing three images, enhancing a resolution of the images to obtain for each image a high-resolution image (HRI), obtaining two displacement vectors using the HRIs, obtaining a superimposed HRI based on the HRIs and the displacement vectors, obtaining a compensatory vector based on the displacement vectors, and generating a super-resolution image based on the superimposed HRI and the compensatory vector.

12 Claims, 5 Drawing Sheets

REAL-TIME IMAGE PROCESSING METHOD AND DEVICE ENHANCING THE RESOLUTION OF SUCCESSIVE IMAGES

CROSS-REFERENCE TO RELATED APPLICATIONS

This non-provisional application claims priority under 35 U.S.C. §119(a) on Patent Application No. 102121252 filed in Taiwan, R.O.C. on Jun. 14, 2013, the entire contents of which are hereby incorporated by reference.

TECHNICAL FIELD

The present invention relates to image processing, particularly to a method and a device of image processing with real-time resolution computation.

BACKGROUND

Recent advances in image processing techniques are primarily focused on improving a general user's visual experience, which is to a large extent affected by image resolution. As for handheld cameras or optical-zoom-capable surveillance cameras, shake, sway, or vibration of the camera body also contributes negatively to the visual experience.

To make an image high-resolution and clear, a digital still camera (DSC) or video camera typically employs optical zoom and digital zoom. Digital zoom takes over from optical zoom when the user demands a magnifying ratio larger than that supported by optical zoom. The camera's built-in processor performs digital zoom to simulate magnification, where some of the pixels are artificially generated and thus deteriorate the image. Magnifying the image without increasing the visual clarity often results in a blurry magnified image. The problem intensifies as the magnifying ratio becomes larger.

Furthermore, the general user is most likely not a professional photographer and is prone to shake the DSC or video camera while using it. Mechanical stabilizers installed on the lens have been developed to cope with this. The side effect, however, is added cost and weight to the camera, in conflict with the user's demand for lightness. In addition, mechanical stabilization does not address the demand for resolution enhancement.

In short, solutions exist for various aspects of image processing, though they are by no means perfect. Digital zoom is limited when it comes to obtain images of high visual clarity, and mechanical stabilization complicates camera design, adding weight and cost despite alleviating shake-induced image blurring.

SUMMARY

In light of the above, the present invention discloses a method and a device of real-time image processing, assisting the user to counter the effect of shake or vibration and enhance the resolution of successive images.

The real-time image processing method of the present invention comprises: capturing a plurality of images, the quantity of the images being three; enhancing a resolution of each of the images to obtain a plurality of high-resolution images, the quantity of the high-resolution images being three; obtaining a plurality of displacement vectors using the high-resolution images, the quantity of the displacement vectors being two; obtaining a superimposed high-resolution image based on the high-resolution images and the displacement vectors; obtaining a compensatory vector based on the displacement vectors; and generating a super-resolution image based on the superimposed high-resolution image and the compensatory vector.

The real-time image processing device of the present invention comprises an image capturing unit and an image processing unit. The image capturing unit is configured to capture a plurality of images, the quantity of the images being three. The image processing unit, coupled with the image capturing unit, is configured to execute a method to obtain a super-resolution image. The method comprises: enhancing a resolution of each of the images to obtain a plurality of high-resolution images, the quantity of the high-resolution images being three; obtaining a plurality of displacement vectors using the high-resolution images, the quantity of the displacement vectors being two; obtaining a superimposed high-resolution image based on the high-resolution images and the displacement vectors; obtaining a compensatory vector based on the displacement vectors; and generating the super-resolution image based on the superimposed high-resolution image and the compensatory vector.

BRIEF DESCRIPTION OF THE DRAWING

The present invention will become more fully understood from the detailed description given herein below and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides a method and a device of real-time image processing. The device may be a DSC, a video camera, a surveillance camera, or any device capable of executing the real-time image processing method. The device may be used in surveillance or observation while being handheld or mounted on automatic or general moving equipment.

Figure 1:
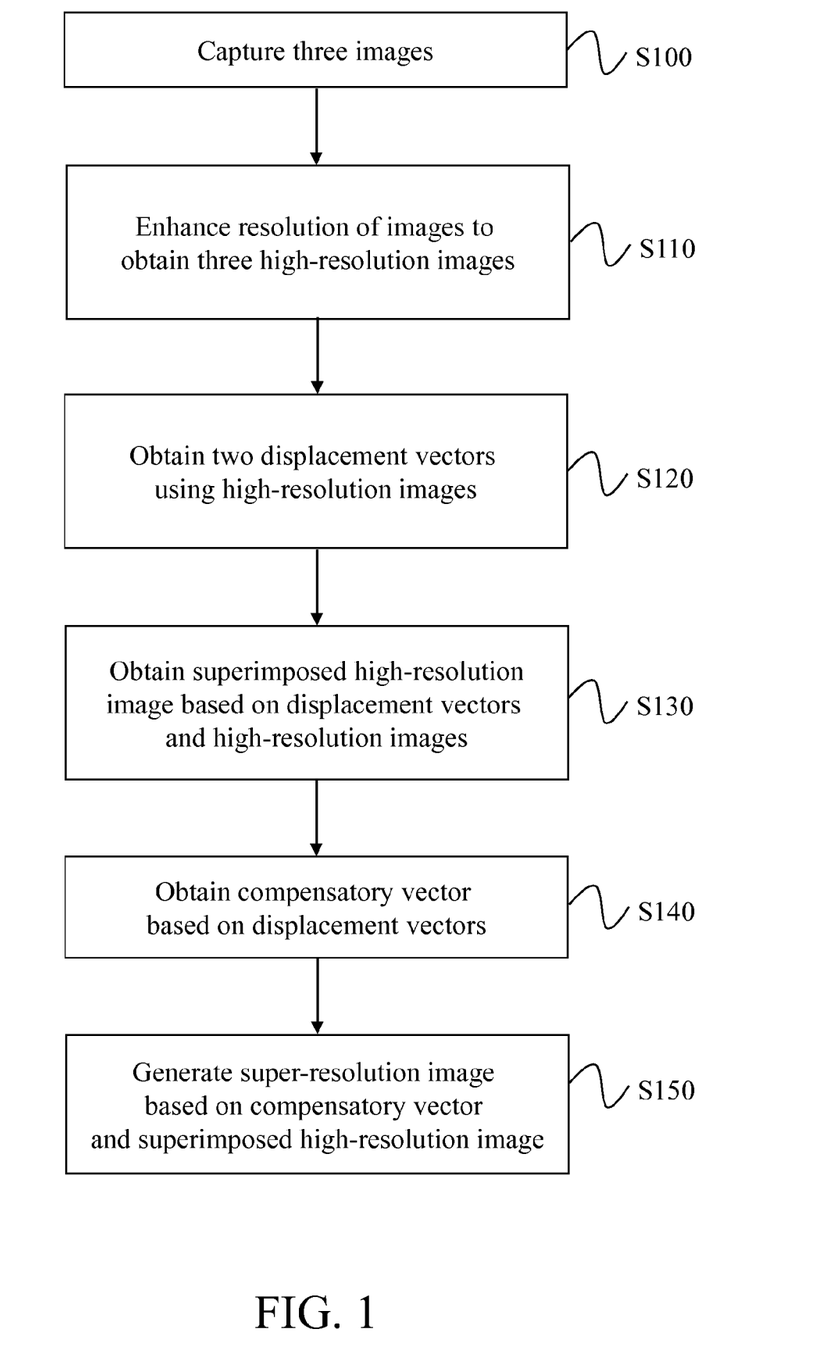
FIG. 1 is a flowchart of a real-time image processing method, in accordance with an embodiment of the present invention.

Please refer to FIG. 1. As shown in the flowchart, in one embodiment the real-time image processing method comprises capturing S100 three images, enhancing S110 a resolution of the images to obtain a high-resolution image (hereinafter referred to as HRI) for each of the images, obtaining S120 two displacement vectors using the HRIs, obtaining S130 a superimposed HRI based on the HRIs and the displacement vectors, obtaining S140 a compensatory vector based on the displacement vectors, and generating S150 a super-resolution image based on the superimposed HRI and the compensatory vector.

Figure 2:
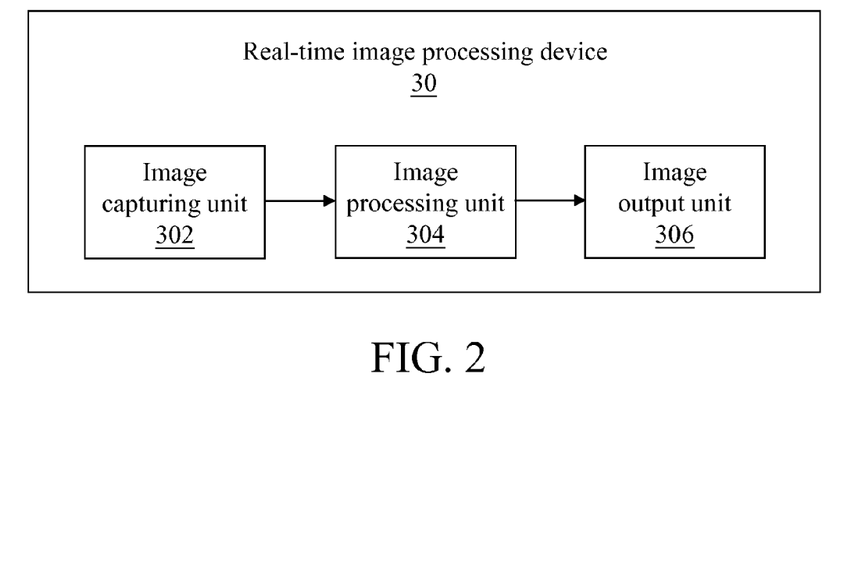
FIG. 2 is a block diagram of a real-time image processing device, in accordance with an embodiment of the present invention.
Figure 3:
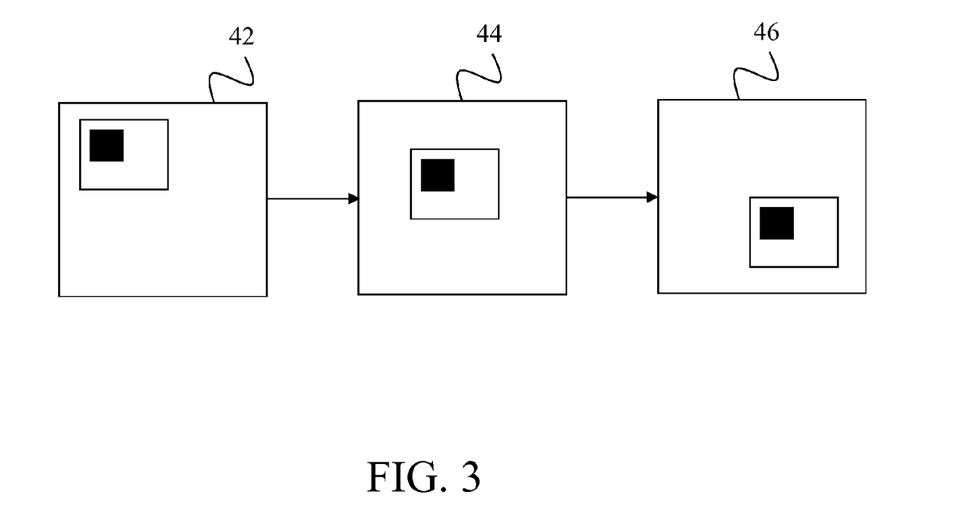
FIG. 3 illustrates an image content being displaced in a real-time image processing method, in accordance with an embodiment of the present invention.

Step S100 is hereby described with regard to FIGS. 2 and 3. An image capturing unit 302 of the real-time image processing device (30) captured the images 42, 44, and 46. The images 42, 44, and 46 are of the same view and are successive in time; that is, the images 42, 44, and 46 were captured sequentially along the time axis in this embodiment, though not necessarily so in others. The number of images is not limited to three, though it must be at least two. The super-resolution image generated at the end of the real-time image processing method is finer when there are more images captured.

Figure 4:
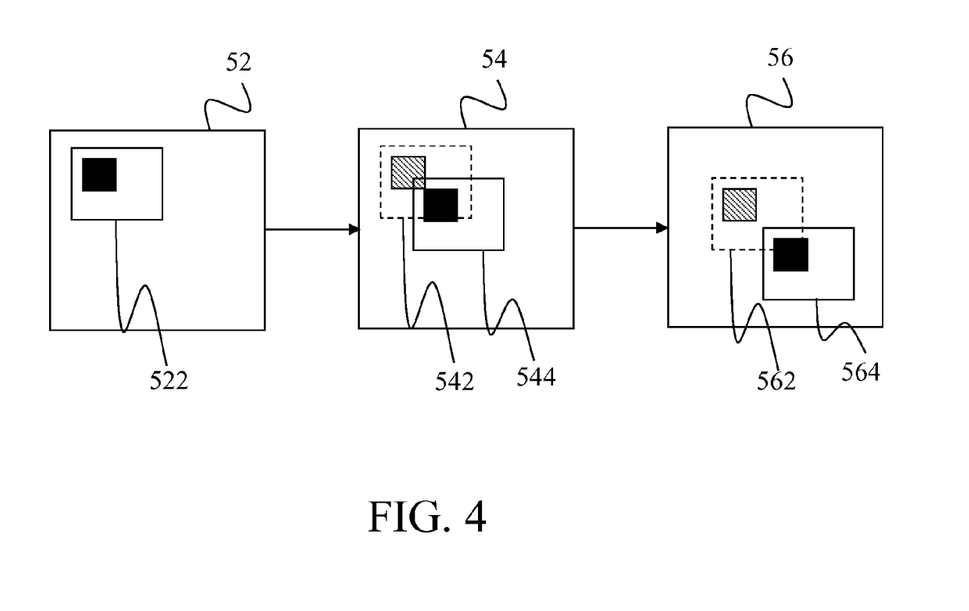
FIG. 4 illustrates the positions of a displaced image content being compared in a real-time image processing method, in accordance with an embodiment of the present invention.

Step S110 is hereby described with regard to FIGS. 3 and 4. Each of the images 42, 44, and 46 has a plurality of original pixels, and enhancing the resolution of the images 42, 44, and 46 may be, but not limited to, inserting blank pixels between the original pixels of each of the images 42, 44, and 46. Inserting blank pixels between the original pixels of the image 42 gives rise to the HRI 52. Likewise, the HRI 54 is an enhanced image 44, and the HRI 56 an enhanced image 46. Please note that the resolution enhancement is not necessarily "square"; that is, the magnifying ratio may not be the same lengthwise and widthwise. The resolution enhancement may be "rectangular." For instance, an image may be magnified three times along one axis (e.g. horizontally) and two times along the other (e.g. vertically). The aspect ratio of a resolution-enhanced image may be, but not limited to, 16:9 or 16:10.

Step S120 is hereby described with regard to FIG. 4. An image content 522 was locked on in the HRI 52 and continuously tracked in the HRIs 54 and 56. The image content 522 changed positions in the HRI 54 to become the image content 544, its previous position 542 in the HRI 52 indicated by dashed lines. A first displacement vector is obtained by comparing the coordinates. The image content 544 changed positions again in the HRI 56 to become the image content 564, its previous position 562 in the HRI 54 indicated by dashed lines. A second displacement vector is obtained by comparing the coordinates. Block motion estimation (BME) or optical flow may be, but not necessarily, employed to compare the HRIs 52, 54, and 56 to yield the displacement vectors, as detailed later.

Figure 5:
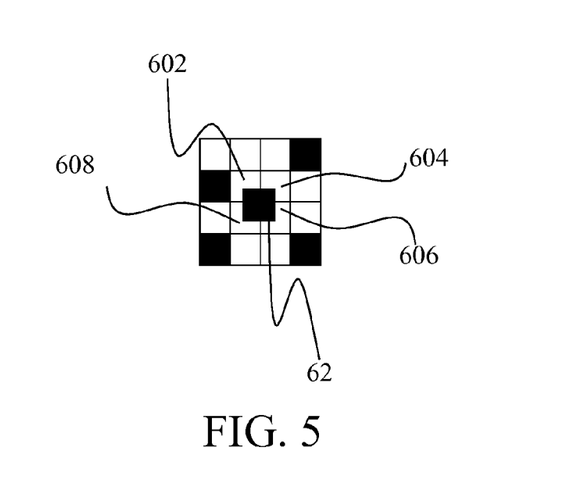
FIG. 5 illustrates a pixel overlaid in a superimposed high-resolution image in a real-time image processing method, in accordance with an embodiment of the present invention.

Step S130 is hereby described with regard to FIGS. 4 and 5. The HRI 54 is reversely adjusted to correspond to the HRI 52 based on the first displacement vector; that is, the image content 544 is moved back to the previous position 542. Likewise, the HRI 56 is adjusted twice to correspond to the HRI 52 based on the first and second displacement vectors. In other words, the image content 564 is first moved to the previous position 562 and then to the previous position 542. Superimposing the adjusted HRIs 54 and 56 onto the HRI 52 results in the superimposed HRI, which by nature comprises the original pixels of each of the images 42, 44, and 46, in addition to some residual blank pixels. Some of these original pixels may straddle pixel positions in the superimposed HRI.

The overlay pixel 62, for example, straddles pixel positions 602, 604, 606, and 608. The brightness values of the neighboring residual blank pixels are calculated based on that of the overlay pixel 62. Specifically, for a residual blank pixel, its brightness is interpolated from the values of the surrounding original pixels. Saturation is calculated in addition to brightness for color images.

In step S140, the compensatory vector is obtained using the first and second displacement vectors. In one embodiment, the compensatory vector is computed based on the following simultaneous equations:

$$\tilde{V}_n = \frac{\tilde{V}_{n-1}W_{n-1} + V_nW_n}{W_{n-1} + W_n}$$

$$\tilde{V}_1 = (0, 0)$$

$$V_n = \sum_{i=k}^{n} V'_i$$

where i, n, and k are natural numbers, $V'_i$ is the displacement vector of an i-th image relative to an (i−1)-th image, $\tilde{V}_i$ is the compensatory vector of the i-th image, and $W_{n-1}$ and $W_n$ are real-number weights. k is determined using sum of absolute differences (SAD); that is, $$SAD(A, B) = \sum_{(x,y) \in A} |A(x, y) - B(x, y)|$$

where A(x,y) represents a pixel value corresponding to a pixel coordinate set or coordinates (x,y) in an image A, and B(x,y) represents a pixel value corresponding to the pixel coordinates (x,y) in an image B. k is set to j if SAD (a j-th image, a (j−1)-th image) is greater than a real-number threshold value, j being a natural number; otherwise k is set to 1.

It is assumed that the image 42 was the first image captured after the real-time image processing device 30 initiated image capturing. $V'_1$, therefore, does not exist, and $\tilde{V}_1=(0,0)$. Let $\tilde{V}_1$ take no weight (i.e., let $W_1=0$). Let $V'_2$ be the first displacement vector and $V'_3$ the second. $\tilde{V}_2$, the compensatory vector of the (second) image 44, is then simply $V_2$ according to the simultaneous equations above with $\tilde{V}_1=(0,0)$ and $W_1=0$, regardless of the value of $W_2$. The objective of step S140 is to obtain $\tilde{V}_3$, the compensatory vector of the (third) image 46.

For n=3 and beyond, $W_{n-1}$ and $W_n$ are constants $W_a$ and $W_b$, respectively. $W_a$ and $W_b$ may be identical or different. To make the result of vector compensation more akin to the latest situation, let $W_b$ be greater than $W_a$, e.g. $W_b=0.7$ and $W_a=0.3$. To make the result of vector compensation more stable, let $W_b$ be smaller than $W_a$, e.g. $W_b=0.3$ and $W_a=0.7$. The weights can be user-defined.

If the result of the above SAD computation is greater than a real-number threshold value, the image sequence is reset, the next images becoming the first, the second, and so on, to calculate the compensatory vectors as described above.

In step S150, the super-resolution image is generated by displacing whole contents in the superimposed HRI (from step S130) using the compensatory vector (from step S140). The super-resolution image is then output.

In the current embodiment, the image 42 is not output since there is no prior image for superimposition. The image 44 is not output, either, because there is only one image 42 available for superimposition.

In another embodiment, the image 42 can be digitally magnified (e.g. by interpolation) and output, and the image 44 is superimposed onto the image 42 and output. The general user may therefore have a smoother visual experience, despite that the first two output images are of lower quality.

Please refer to FIG. 2. As shown in the block diagram, the real-time image processing device 30 comprises the image capturing unit 302, an image processing unit 304, and an image output unit 306. In the current embodiment, the image capturing unit 302 sends the images 42, 44, and 46 to the image processing unit 304, which in turn sends the super-resolution image to the image output unit 306.

The image capturing unit 302, configured to capture images and convert them into digital data, may be a photon sensor of a DSC, a digital video camera, or a surveillance camera system. In particular, the image capturing unit 302 may be a charge-coupled device (CCD) or based on complementary metal-oxide-semiconductor (CMOS).

The image processing unit 304 is configured to execute at least part of the real-time image processing method, which is an amalgam of the procedures of the invention for obtaining the super-resolution image and stabilizing the HRIs 52, 54, and 56. The image processing unit 304 may be a processor capable of performing image processing, such as a central processing unit (CPU) or an image processor of a DSC or digital video camera. Per user request, the image processing unit 304 optionally performs image compression to generate, say, JPEG or GIF files, after the real-time image processing method is completed.

The image output unit 306 outputs the super-resolution image acquired by the image processing unit 304 to a target device. The target device may be storage equipment connected to the image output unit 306, a memory card or hard disk drive for instance, or it may be remote storage equipment connected through a wired or wireless network. A wired connection may be physical cables or Universal Serial Bus (USB) links; a wireless connection may be based on Wi-Fi or Bluetooth.

Figure 6:
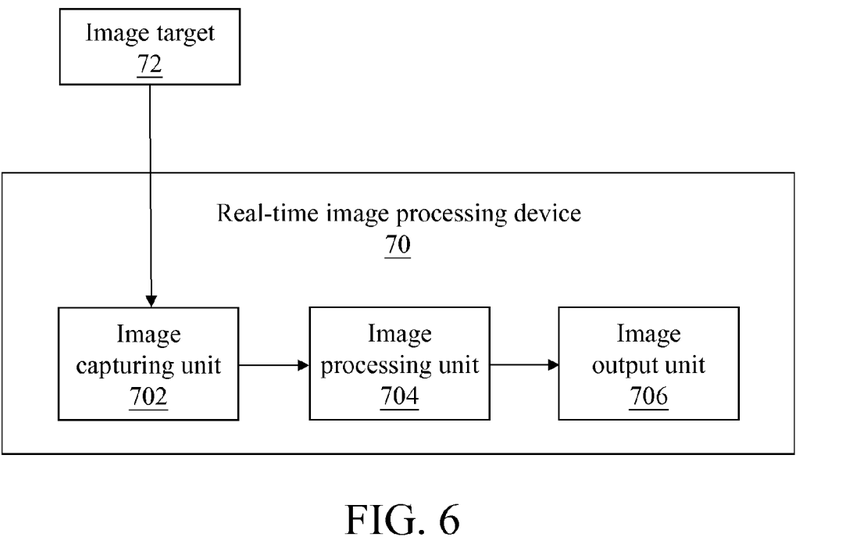
FIG. 6 illustrates a use case of a real-time image processing device, in accordance with an embodiment of the present invention.

Please refer to FIG. 6. The block diagram shows the real-time image processing device (70, described as 20 in FIG. 2) and an image target 72, which is what the user is photographing.

Suppose that the real-time image processing device 70 is a surveillance camera in an airport. Given the high security concerns of the airport, the camera is by necessity capable of optical zoom with large magnifying ratios, a side effect being that the vibration of the camera body due to natural causes is also magnified and observable on the captured images. The present invention can counter this side effect and generate HRIs. The image target 72 is contained in the interior of the airport. The image capturing unit 702 comprises a lens with optical zoom and captures a first image, a second image, and a third image with regard to the image target 72. The images are sent to the image processing unit 704, which obtains a first HRI, a second HRI, and a third HRI by inserting blank pixels between original ones of the images, based on a default or dynamically set magnifying ratio.

The first and second HRIs are compared through optical flow to yield a first displacement vector $V'_2$. Likewise, the second and third HRIs are compared to yield a second displacement vector $V'_3$. Using $V'_2$ and $V'_3$ as reference, at least part of the HRIs are superimposed with regard to the image target 72, which appears throughout the images. A superimposed HRI is thus obtained with residual blank pixels accounted for by interpolation as formerly described. Substituting $V'_2$ and $V'_3$ into the aforesaid equations gives a compensatory vector $\tilde{V}_3$ of the third HRI. Displacement of contents is then performed on the superimposed HRI based on $\tilde{V}_3$, resulting in a super-resolution image. A later part of this disclosure elaborates on the above computation. The super-resolution image is sent to the image output unit 706, which may be a closed-circuit television (CCTV) in a security control room.

Besides optical flow, there are other known algorithms by which the displacement vectors can be obtained.

In another example, suppose that the real-time image processing device 70 is a handheld DSC. Photographing in motion often leads to the camera being shaken. The present invention can counter the shake-induced blurring and generate HRIs. The target 72 is for example an animal, a human-being, or an inanimate object. The image capturing unit 702 comprises a lens with optical zoom and captures a first image, a second image, and a third image with regard to the image target 72. The images are sent to the image processing unit 704, which obtains a first HRI, a second HRI, and a third HRI by inserting blank pixels between original ones of the images, based on a default or dynamically set magnifying ratio.

The first and second HRIs are compared through pixel-value differencing to yield a first displacement vector $V'_2$. Likewise, the second and third HRIs are compared to yield a second displacement vector $V'_3$. Using $V'_2$ and $V'_3$ as reference, at least part of the HRIs are superimposed with regard to the image target 72, which appears throughout the images. A superimposed HRI is thus obtained with residual blank pixels accounted for by interpolation as formerly described. Substituting $V'_2$ and $V'_3$ into the aforesaid equations gives a compensatory vector $\tilde{V}_3$ of the third HRI. Displacement of contents is then performed on the superimposed HRI based on $\tilde{V}_3$, resulting in a super-resolution image. A later part of this disclosure elaborates on the above computation. The super-resolution image is sent to the image output unit 706, which may be a view-finding liquid crystal display (LCD) of the DSC.

Besides pixel-value differencing, there are other known algorithms by which the displacement vectors can be obtained.

Figure 7:
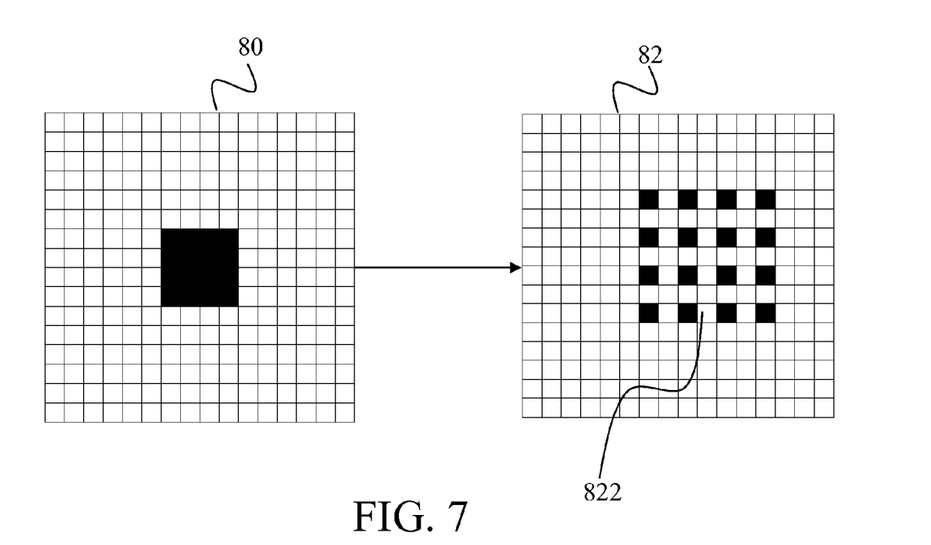
FIG. 7 illustrates the obtainment of a high-resolution image in a real-time image processing method, in accordance with an embodiment of the present invention.

Please refer to FIG. 7, which depicts an original image 80 and a part 82 of a HRI. As shown in the diagram, some of the pixels of the original image 80 form a block of color. The HRI is obtained by magnifying the original image 80 four times. Through a scaling algorithm, the block of color is filled with several blank pixels 822 in the part 82 of the HRI.

Figure 8:
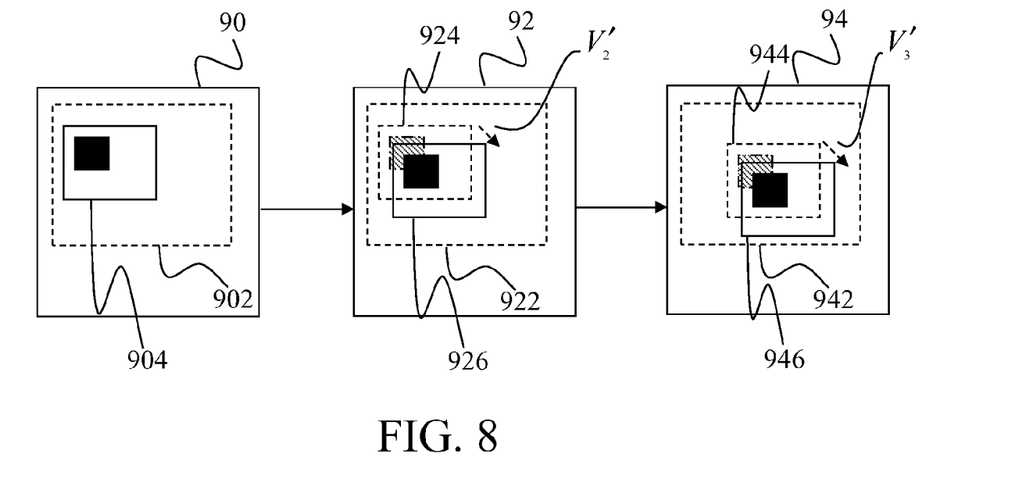
FIG. 8 illustrates displacement vectors being calculated in a real-time image processing method, in accordance with an embodiment of the present invention.

Please refer to FIG. 8, which shows surveillance screens four-time magnified to become HRIs 90, 92, and 94, as formerly described. The HRIs 90, 92, and 94 are captured sequentially along the time axis; that is, the HRI 90 is obtained earlier than the HRI 92, and the HRI 92 is obtained earlier than the HRI 94. In this example, displacement vectors are calculated by BME, which in principle is detecting pixels of certain regions in the screens, or locking on a plurality of blocks 902, 922, and 942.

The first block 902 is locked on in the HRI 90, and an image content 904 in the block 902 is continuously tracked in the HRIs 92 and 94. The image content 904 changed positions in the HRI 92 to become the image content 926 in the block 922, its previous position 924 in the HRI 90 indicated by dashed lines. A first displacement vector $V'_2$ is obtained as (3,3) by comparing the coordinates. The image content 926 changed positions again in the HRI 94 to become the image content 946 in the block 942, its previous position 944 in the HRI 92 indicated by dashed lines. A second displacement vector $V'_3$ is obtained as (5,5) by comparing the coordinates. Please note that the calculated displacement vectors may have integral or fractional components.

The HRI 92 is reversely adjusted to correspond to the HRI 90 based on V'$_2$; that is, the image content 926 is moved back to the previous position 924. Likewise, the HRI 94 is adjusted twice to correspond to the HRI 90 based on V'$_2$ and V'$_3$. In other words, the image content 946 is first moved to the previous position 944 and then to the previous position 924. Superimposing the adjusted HRIs 92 and 94 onto the HRI 90 results in a superimposed HRI, which by nature comprises the original pixels of the surveillance screens, in addition to some residual blank pixels. The values of the residual blank pixels are calculated based on the original pixels.

A compensatory vector is computed based on the aforesaid equations. In this example, $\tilde{V}_1=(0,0)$, V'$_2$=V$_2$=$\tilde{V}_2$=(3,3), V'$_3$=(5,5), V$_3$=(8,8). Let W$_a$=W$_b$=0.5, then $$\tilde{V}_3 = \frac{\tilde{V}_2 W_a + V_3 W_b}{W_a + W_b} = \frac{(3,3) \cdot 0.5 + (8,8) \cdot 0.5}{0.5 + 0.5} = (5.5, 5.5)$$

where $\tilde{V}_3$ is the compensatory vector of the HRI 94. Displacement of contents by (−5.5,−5.5) is then performed on the superimposed HRI, resulting in a super-resolution image. Please note that such displacement involves interpolation since the compensatory vector consists of fractions.

BME or optical flow may be employed to yield V'$_2$ and V'$_3$. BME may be, but not necessarily, implemented with pixel-value differencing.

To summarize the present invention, the real-time image processing method and device, by enhancing image resolution, outputs and stabilizes a super-resolution image without the general user experiencing latency. Implemented in an image processor, the present invention does not incur additional hardware cost for DSCs, digital video cameras, or surveillance systems. The two procedures of outputting and stabilization, no longer separately executed, are fused to reduce the temporal cost of image processing.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A real-time image processing method comprising:
    capturing a plurality of images, a quantity of the plurality of images being three;
    enhancing a resolution of each of the plurality of images to obtain a plurality of high-resolution images, a quantity of the plurality of high-resolution images being three;
    obtaining a plurality of displacement vectors using the plurality of high-resolution images, a quantity of the plurality of displacement vectors being two;
    obtaining a superimposed high-resolution image based on the plurality of high-resolution images and the plurality of displacement vectors;
    obtaining a compensatory vector based on the plurality of displacement vectors; and
    generating a super-resolution image based on the superimposed high-resolution image and the compensatory vector.

2. The real-time image processing method of claim 1, wherein each of the plurality of images comprises a plurality of original pixels, and the enhancing the resolution of each of the plurality of images is inserting a plurality of blank pixels between the original pixels of each of the plurality of images based on a magnifying ratio.

3. The real-time image processing method of claim 1, wherein the obtaining the plurality of displacement vectors comprises:
    computing the plurality of displacement vectors using block motion estimation or optical flow.

4. The real-time image processing method of claim 1, wherein each of the plurality of images comprises a plurality of original pixels, and the obtaining the superimposed high-resolution image comprises:
    superimposing the plurality of high-resolution images based on the plurality of displacement vectors to obtain the superimposed high-resolution image, the superimposed high-resolution image comprising the original pixels of each of the plurality of images and a plurality of residual blank pixels; and
    obtaining a plurality of pixel values of the residual blank pixels based on the original pixels of each of the plurality of images.

5. The real-time image processing method of claim 1, wherein the obtaining the compensatory vector is based on a system of equations, the system of equations being:

$$\tilde{V}_n = \frac{\tilde{V}_{n-1} W_{n-1} + V_n W_n}{W_{n-1} + W_n}$$

$$\tilde{V}_1 = (0, 0)$$

$$V_n = \sum_{i=k}^{n} V'_i$$

wherein i, n, and k are natural numbers, V'$_i$ is an i-th displacement vector of an i-th image relative to an (i−1)-th image, $\tilde{V}_i$ is an i-th compensatory vector of the i-th image, and W$_{n-1}$ and W$_n$ are real-number weights;
wherein the i-th image and the (i−1)-th image are of the plurality of images, the i-th displacement vector is of the plurality of displacement vectors;
wherein W$_{n-1}$ is a constant W$_a$ and W$_n$ is a constant W$_b$ for n≥3.

6. The real-time image processing method of claim 5, wherein k is determined by an expression of sum of absolute differences (SAD), the expression being:

$$SAD(A, B) = \sum_{(x,y) \in A} |A(x, y) - B(x, y)|$$

wherein A(x,y) represents a pixel value corresponding to a pixel coordinate set (x,y) in an image A, and B(x,y) represents a pixel value corresponding to a pixel coordinate (x,y) in an image B;
wherein k is set to j if SAD (a j-th image, a (j−1)-th image) is greater than a real-number threshold value, j being a natural number;
wherein k is set to 1 if SAD (the j-th image, the (j−1)-th image) is not greater than the real-number threshold value;
wherein the j-th image and the (j−1)-th image are of the plurality of images.

7. A real-time image processing device comprising:
an image capturing unit configured to capture a plurality of images, a quantity of the plurality of images being three; and
an image processing unit coupled with the image capturing unit and configured to enhance a resolution of each of the plurality of images to obtain a plurality of high-resolution images, a quantity of the plurality of high-resolution images being three, to obtain a plurality of displacement vectors using the plurality of high-resolution images, a quantity of the plurality of displacement vectors being two, to obtain a superimposed high-resolution image based on the plurality of high-resolution images and the plurality of displacement vectors, to obtain a compensatory vector based on the plurality of displacement vectors, and to generate a super-resolution image based on the superimposed high-resolution image and the compensatory vector.

8. The real-time image processing device of claim 7, further comprising an image output unit coupled with the image processing unit and configured to output the super-resolution image.

9. The real-time image processing device of claim 7, wherein the image processing unit is further configured to perform image compression.

10. The real-time image processing device of claim 7, wherein the image capturing unit is capable of optical zoom.

11. The real-time image processing device of claim 7, wherein the compensatory vector is obtained based on a plurality of equations, the plurality of equations being:

$$\tilde{V}_n = \frac{\tilde{V}_{n-1} W_{n-1} + V_n W_n}{W_{n-1} + W_n}$$

$$\tilde{V}_1 = (0, 0)$$

$$V_n = \sum_{i=k}^{n} V'_i$$

wherein i, n, and k are natural numbers, $V'_i$ is an i-th displacement vector of an i-th image relative to an (i−1)-th image, $\tilde{V}_i$ is an i-th compensatory vector of the i-th image, and $W_{n-1}$ and $W_n$ are real-number weights;

wherein the i-th image and the (i−1)-th image are of the plurality of images, the i-th displacement vector is of the plurality of displacement vectors;

wherein $W_{n-1}$ is a constant $W_a$ and $W_n$ is a constant $W_b$ for n≥3.

12. The real-time image processing device of claim 11, wherein k is determined by an expression of sum of absolute differences (SAD), the expression being:

$$SAD(A, B) = \sum_{(x,y) \in A} |A(x, y) - B(x, y)|$$

wherein A(x,y) represents a pixel value corresponding to a pixel coordinate set (x,y) in an image A, and B(x,y) represents a pixel value corresponding to a pixel coordinate set (x,y) in an image B;

wherein k is set to j if SAD (a j-th image, a (j−1)-th image) is greater than a real-number threshold value, j being a natural number;

wherein k is set to 1 if SAD (the j-th image, the (j−1)-th image) is not greater than the real-number threshold value;

wherein the j-th image and the (j−1)-th image are of the plurality of images.

* * * * *